United States Patent
Suzuki

(10) Patent No.: US 9,123,327 B2
(45) Date of Patent: Sep. 1, 2015

(54) VOICE RECOGNITION APPARATUS FOR RECOGNIZING A COMMAND PORTION AND A DATA PORTION OF A VOICE INPUT

(71) Applicant: DENSO CORPORATION, Kariya, Aichi-pref. (JP)

(72) Inventor: Ryuichi Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 334 days.

(21) Appl. No.: 13/713,103

(22) Filed: Dec. 13, 2012

(65) Prior Publication Data
US 2013/0166290 A1    Jun. 27, 2013

(30) Foreign Application Priority Data
Dec. 26, 2011    (JP) .................. 2011-283333

(51) Int. Cl.
*G10L 15/22*    (2006.01)
*G10L 15/00*    (2013.01)

(52) U.S. Cl.
CPC ................ *G10L 15/00* (2013.01); *G10L 15/22* (2013.01)

(58) Field of Classification Search
USPC .......................................... 704/275, 231–257
See application file for complete search history.

(56) References Cited

U.S. PATENT DOCUMENTS

| | | | |
|---|---|---|---|
| 5,799,279 A * | 8/1998 | Gould et al. | 704/275 |
| 6,757,655 B1 * | 6/2004 | Besling et al. | 704/270.1 |
| 6,871,179 B1 * | 3/2005 | Kist et al. | 704/275 |
| 8,165,886 B1 * | 4/2012 | Gagnon et al. | 704/275 |
| 2003/0065516 A1 | 4/2003 | Hitotsumatsu | |
| 2007/0136059 A1 * | 6/2007 | Gadbois | 704/246 |

FOREIGN PATENT DOCUMENTS

| | | |
|---|---|---|
| JP | 2001-022373 A | 1/2001 |
| JP | 2001-075593 A | 3/2001 |
| JP | 2001-306088 A | 11/2001 |
| JP | 2005-003997 A | 1/2005 |
| JP | 2008-003266 A | 1/2008 |
| JP | 2010-204175 A | 9/2010 |

OTHER PUBLICATIONS

Office action mailed Jan. 7, 2014 in the corresponding JP application No. 2011-283333 (and English translation).

* cited by examiner

*Primary Examiner* — Abul Azad
(74) *Attorney, Agent, or Firm* — Posz Law Group, PLC

(57) ABSTRACT

A voice recognition apparatus includes a command recognizer and a data recognizer. The command recognizer recognizes a command portion of a voice input and outputs a command based on a voice recognition result of the voice input. The data recognizer recognizes a data portion of a voice inputs and outputs a data based on a voice recognition result of the voice input. The data recognizer further includes a plurality of data-category recognizers respectively using a data-category dictionary for recognizing the data portion of the voice input and outputting a data result. A voice recognition result selection unit of the voice recognition apparatus selects one of the data results from the data-category recognizers based on the command recognized by the command recognizer.

7 Claims, 7 Drawing Sheets

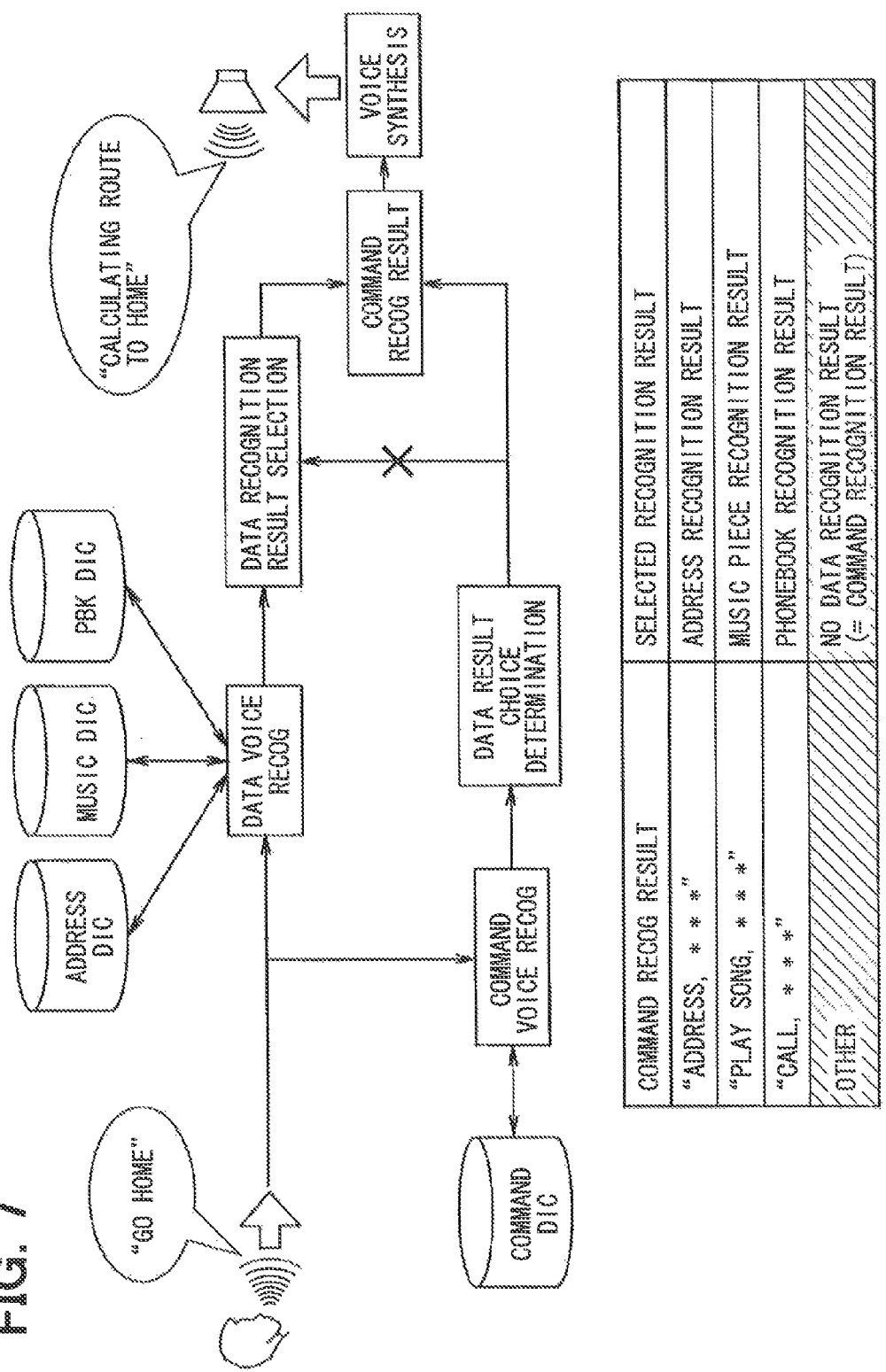

VOICE RECOGNITION APPARATUS FOR RECOGNIZING A COMMAND PORTION AND A DATA PORTION OF A VOICE INPUT

CROSS REFERENCE TO RELATED APPLICATION

The present application is based on and claims the benefit of priority of Japanese Patent Application No. 2011-283333, filed on Dec. 26, 2011, the disclosure of which is incorporated herein by reference.

TECHNICAL FIELD

The present disclosure generally relates to a voice recognition apparatus which is used to input voice commands.

BACKGROUND

Conventionally, a voice recognition apparatus compares plural comparison patterns of pre-stored data with a voice input, and outputs a recognition result of high matching degree. A voice recognition apparatus may be used for a voice input of a destination, which may be set to, for example, a navigation apparatus. Such voice input of a destination is especially beneficial for a user, or, for a driver of a vehicle, allowing him/her to set the destination without performing a button operation or without looking at a display screen of the navigation apparatus, thereby improving the safety of the user.

For allowing the voice input of a destination, the voice recognition apparatus should allow the user to input a specific place name or the like with ease. For instance, the user should be allowed to not only input the prefecture name and the city name but also the county, town, street name and/or a section of a village. Further, when the user would like to set the destination, such as "Main St., New York City, N.Y.," the user may prefer to input such address as one stretch of voice (i.e., in one breath) for the ease of input rather than adding pauses between certain words or group of words (i.e., separately voicing the same address), for example, "New York" <pause>, "New York City" <pause>, "Main St". The uninterrupted series of words, or, a command data combination input, may be referred to as a continuous input.

Therefore, to accept the continuous input, Japanese Patent Laid-Open No. 2001-306088 (JP '088) discloses a "tree structure" recognition dictionary, which hierarchically connects/combines recognition objects (i.e., voiced words), sifting the recognition vocabulary for each of the hierarchies. Alternatively, Japanese Patent Laid-Open No. 2003-114696 (JP '696) allows the continuous input of, for example, a street address of the United States, which does not fit to the tree structure recognition dictionary of JP '088, by hierarchically combing the words from a lower to a higher hierarchy, instead of combining the words from a higher to lower hierarchy, which is usually the case.

However, for allowing the continuous input, the voice recognition apparatus has to have a much larger dictionary that carries a very big recognition vocabulary, in comparison to one allowing a normal, hierarchical input. Further, as the vocabulary is expanded, a voice recognition rate of successfully recognizing words drops in general. Therefore, in the conventional voice recognition apparatus, the continuous input is limited only to one data-category such as a street address, for the purpose of improving the recognition rate. In such configuration, the apparatus should be put into a certain operation mode by a specific command, allowing an input of only one data-category, before actually performing the continuous input for the voice recognition. However, this may be cumbersome for the user, that is, an input of such a specific mode-setting command for performing the voice recognition even when such command is only one word.

SUMMARY

In an aspect of the present disclosure a voice recognition apparatus includes: a command recognizer, a data recognizer, and a voice recognition result selection unit. The command recognizer recognizes the command portion of a voice input and outputs a command based on a voice recognition result of the voice input with reference to a command dictionary.

The data recognizer recognizes a data portion of the voice input and outputs a data based on a voice recognition result of the voice input with reference to a data dictionary. The data dictionary includes a plurality of data-category dictionaries corresponding to a plurality of data categories, and the data recognizer includes a plurality of data-category recognizers, which use one of the plurality of data-category dictionaries for recognizing the data portion of the voice input and outputting a data result.

Based on the command provided by the command recognizer, the voice recognition result selection unit selects one of the data results from data-category recognizers as a most suitable voice recognition result. The voice recognition results selection unit may also output the command recognized by the command recognizer as the most suitable voice recognition result when none of the data results are determined to be suitable.

The voice recognition apparatus of the present disclosure improves a voice recognition rate of a continuous input that allows a voice input to have a mixture of a command and a data. Therefore, the user is able to provide a continuous input (i.e., an uninterrupted input), and the voice recognition rate of the continuous input is improved.

BRIEF DESCRIPTION OF THE DRAWINGS

Other objects, features and advantages of the present disclosure will become more apparent from the following detailed description disposed with reference to the accompanying drawings, in which:

FIG. 7 is a fourth example of the voice recognition process of FIG. 3.

DETAILED DESCRIPTION

An embodiment of the present disclosure applied to a navigation apparatus in a vehicle is described with reference to FIGS. 1 to 7.

Figure 1:
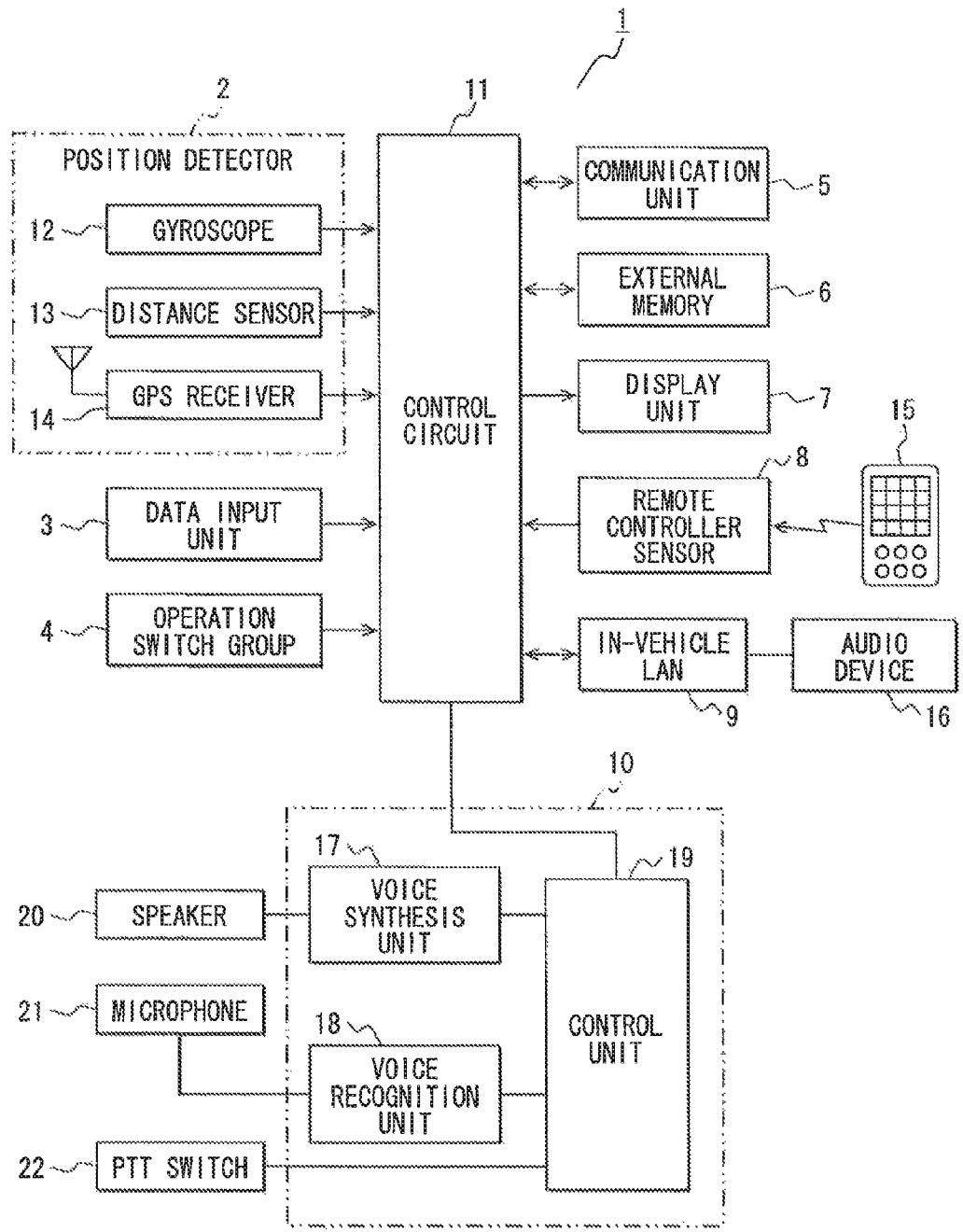
FIG. 1 is a block diagram of a navigation apparatus of the present disclosure.

FIG. 1 is a function block diagram of a navigation apparatus 1 that has a voice recognition function. As illustrated in FIG. 1, the navigation apparatus 1 includes a position detector 2, a data input unit 3, an operation switch group 4 (SW), a communication unit 5, an external memory 6, a display unit 7, a remote sensor 8, an in-vehicle LAN 9, and a voice recognition unit 10 as well as a control circuit 11 connected to those parts. Further, the control circuit 11 is implemented as a normal computer, and includes a well-known type CPU, ROM, RAM, an input/output and a bus line for connecting these parts.

The position detector 2 includes a well-known type gyroscope 12, a distance sensor 13, and a GPS receiver 14 to detect a position of the vehicle based on the electric wave from the satellite. These devices respectively have errors of different natures, thereby compensating with each other for the improved detection accuracy. Further, these devices may be used separately depending on the required accuracy. The position detector 2 may further be supplemented by a steering rotation sensor, a tire rotation sensor, or the like.

The data input unit 3 is used to input various data to be used for navigation, such as a map matching data for improving the accuracy of the position sensing, together with other map data and landmark data. Further, the data input unit 3 is used to input dictionary data that is used for a recognition process of the voice recognition unit 10. The storage medium for such data may be a hard disk drive and/or a DVD, due to the data volume of the map/dictionary data. However, other medium, such as a CD-ROM, may also be used. When a DVD is used as the data storage medium, the data input unit 3 is a DVD player.

The display unit 7 is a color display device, and, a screen of the display unit 7 displays, in an overlapping manner, a current position mark representing a current position of a vehicle, which is provided by the position detector 2, and the map data, which is provided by the data input unit 3, as well as a guidance route, a set point marking, and other additional data to be displayed on a map. Further, a menu screen allowing a choice of multiple options and a command input screen linked with one of the multiple options allowing further options may also be displayed on the display unit 7.

The operation switch group 4 is arranged as, for example, a mechanical switch or a touch switch on the display unit 7 or a combination of both, for inputting various commands. The communication unit 5 is a device for communication with a communication destination that is set by communication destination information, and is implemented as a movable device such as a cellular phone. When the communication unit 5 receives a call placement instruction and a telephone number of a call destination, the communication unit 5 places a call to the call destination having the instructed telephone number, then allows the user to converse with a callee by using a speaker (SP) 20 and a microphone 21 of the voice recognition unit 10.

Further, the navigation apparatus 1 has a route guidance function, accepting a position of a destination either from a remote control terminal 15 through a remote sensor 8 or from the operation switch group 4. The navigation apparatus automatically selects an optimum route from the current position to the destination, which is organized and displayed as a guidance route. Such route guidance function for setting the optimum route may be performed based on a well-known Dijkstra method or the like.

The in-vehicle LAN 9 is connected to various in-vehicle devices in the vehicle, such as an audio device 16. The control circuit 11 may send instructions to the audio device 16 through the in-vehicle LAN 9, such as a playback instruction for playing a musical piece together with the name of the musical piece. According to such instruction, the audio device 16 outputs a playback sound of the instructed music piece. The audio device 16 may be directly incorporated in the navigation apparatus 1.

The voice recognition unit 10 is a voice recognition device that allows the user to vocally input various commands that can be manually input either from the operation switch group 4 or from the remote controller 15.

The voice recognition unit 10 includes a voice synthesis unit 17, a voice recognition unit 18, and a control unit 19, as well as the speaker 20, the microphone 21 (i.e., a voice input unit), and a push-to-talk (PTT) switch 22.

The voice synthesis unit 17 uses a voice wave form stored in a wave form database to synthesize a voice according to a response voice output instruction from the control unit 19, and outputs the synthesized voice from the speaker 20.

The voice recognition unit 18 performs a voice recognition process according to an instruction from the control unit 19 for voice data that is input from the microphone 21, and returns a voice recognition result to the control unit 19. Specifically, the voice recognition unit 18 compares the voice data from the microphone 21 with stored dictionary data, and outputs, from among many comparison patterns, a high rank comparison pattern that has a high matching degree among other patterns.

The voice recognition of a voice input is performed in the following manner. The voice input undergoes an acoustic analysis by using an acoustic model to extract an acoustic characteristic value (e.g., cepstrum coefficient), and yields a time series data of the acoustic characteristic values. A well-known hidden Marcov model (HMM), a DP matching method, or a neural network is used for dividing the time series data into data sections, each of the data sections matched with a word in the dictionary data.

The control unit 19 transmits an output instruction for outputting a response voice to the voice synthesis unit 17 based on the voice recognition result by the voice recognition unit 18. The control unit 19 further provides, for example, a navigation destination and/or a navigation command to the control circuit 11 of the navigation apparatus 1, which performs a process to set the destination or perform the command. As a result, the setting of the destination by the navigation apparatus 1 is enabled by a voice input via the voice recognition unit 10, without manually operating the operation switch group 4 or the remote controller 15.

In the present embodiment, the user may input his/her voice by holding down (i.e., by pressing) the PTT switch 22. More practically, based on a monitoring of how the PTT switch 22 is operated, in terms of the duration of the press of the switch 22 and/or a press/return timing of the switch 22, the control unit 19 instructs the voice recognition unit 18 to perform a voice recognition process when, for example, the PTT switch 22 is pressed. If the PTT switch 22 is not being pressed, the control unit 19 does not allow the voice recognition unit 18 to perform the voice recognition process. Therefore, the voice data that is input from the microphone 21 while the PTT switch 22 is pressed will be provided to the voice recognition unit 18.

Based on the above-described configuration, the navigation apparatus 1 of the present embodiment receives an input of a command and a destination for performing various processes such as a route setting, a route guidance, a facility search, a facility display, and the like.

Figure 2:
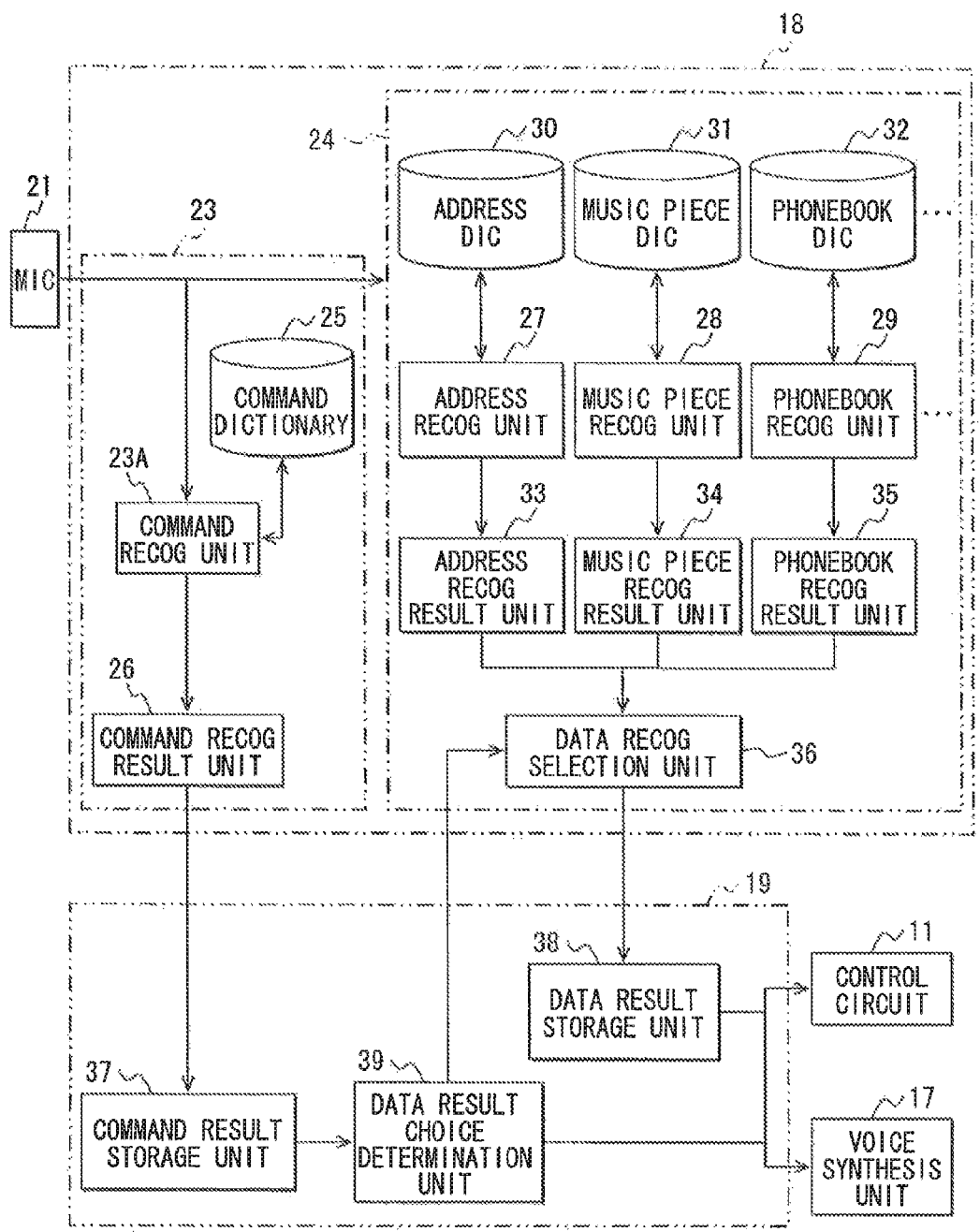
FIG. 2 is a block diagram of a voice recognition unit and a control unit of the navigation apparatus of FIG. 1.

Details of the voice recognition unit 18 and the control unit 19 are described with reference to FIG. 2 in the following.

The voice recognition unit 18 includes a command voice recognition unit 23 (i.e., a command recognizer in claims) and a data voice recognition unit 24 (i.e., a data recognizer in claims). The command voice recognition unit 23 includes a command dictionary 25 and a command recognition unit 23A, which are used in the voice recognition process, and a command recognition result unit 26 for outputting a command recognized from the voice recognition process (i.e., result of the voice recognition process).

The data voice recognition unit 24 includes an address recognition unit 27 (i.e., an address recognizer in claims), a music piece recognition unit 28 (i.e., a music piece recognizer in claims), and a phonebook recognition unit 29 (i.e., a phonebook recognizer in claims). The address recognition unit 27, the music piece recognition unit 28, and the phonebook recognition unit 29 may be referred to as recognition units 27, 28, 29.

In addition, the data voice recognition unit 24 includes an address dictionary 30, a music dictionary 31, and a phonebook dictionary 32 to be used respectively by the recognition units 27, 28, 29 for performing a voice recognition process. The address dictionary 30, the music piece dictionary 31, and the phonebook dictionary 32 are dictionaries for data categories of the address, the music piece, and the telephone, respectively, serving as a plurality of data-category correspondence dictionaries in claims.

The result of the voice recognition process performed by the recognition units 27, 28, 29 and the dictionaries 30, 31, 32 are respectively outputted by an address recognition result unit 33, a music piece recognition result unit 34, and a phonebook recognition result unit 35 (i.e., result units 33, 34, 35). For instance, the address recognition result unit 33 outputs an address recognized from the voice recognition process performed by the address recognition unit 27 and address dictionary 30.

The data voice recognition unit 24 also includes a data recognition result selection unit 36 that selects, as the most suitable voice recognition result, one result from among all of the results provided by the recognition result units 33, 34, 35. Such selection is made based on information provided by a data result choice determination unit 39.

The control unit 19 includes a command result storage unit 37, a data result storage unit 38, and the data result choice determination unit 39.

The command result storage unit 37 stores the command outputted from the command recognition result unit 26 of the voice recognition unit 18. The data result storage unit 38 stores the most suitable voice recognition result selected and provided by the data recognition result selection unit 36 of the voice recognition unit 18.

Based on the command stored in the command result storage unit 37, the data result choice determination unit 39 determines which one of the three recognition units 33, 34, 35 should be selected, as a selected recognition result, for providing the most suitable voice recognition result.

The data recognition result selection unit 36 and the data result choice determination unit 39 respectively have a function as a voice recognition result selection unit in claims.

The voice recognition unit 18 performs voice recognition, for the voice input from the microphone 21, in the command recognition unit 23A by using the command dictionary 25, and also performs voice recognition in the data voice recognition unit 24 by using the data dictionary (i.e., the address dictionary 30, the music piece dictionary 31, and the phonebook dictionary 32).

Based on a voice recognition result from the command voice recognition unit 23, the data result choice determination unit 39 performs a choice determination to determine which one of three voice recognition results that are provided by the three recognition result units 33, 34, 35 of the data voice recognition unit 24 should be selected. Based on the determination from the data result choice determination unit 39, the data recognition result selection unit 36 selects the voice recognition result as the most suitable voice recognition result, which is then stored in the data result storage unit 38. The voice recognition result chosen and stored is passed to the control circuit 11 and to the voice synthesis unit 17.

When the data result choice determination unit 39 determines that none of three recognition results from the three recognition result units 33, 34, 35 should be chosen, the command recognition result from the command voice recognition unit 23 is passed to the control circuit 11 and to the voice synthesis unit 17.

Figure 3:
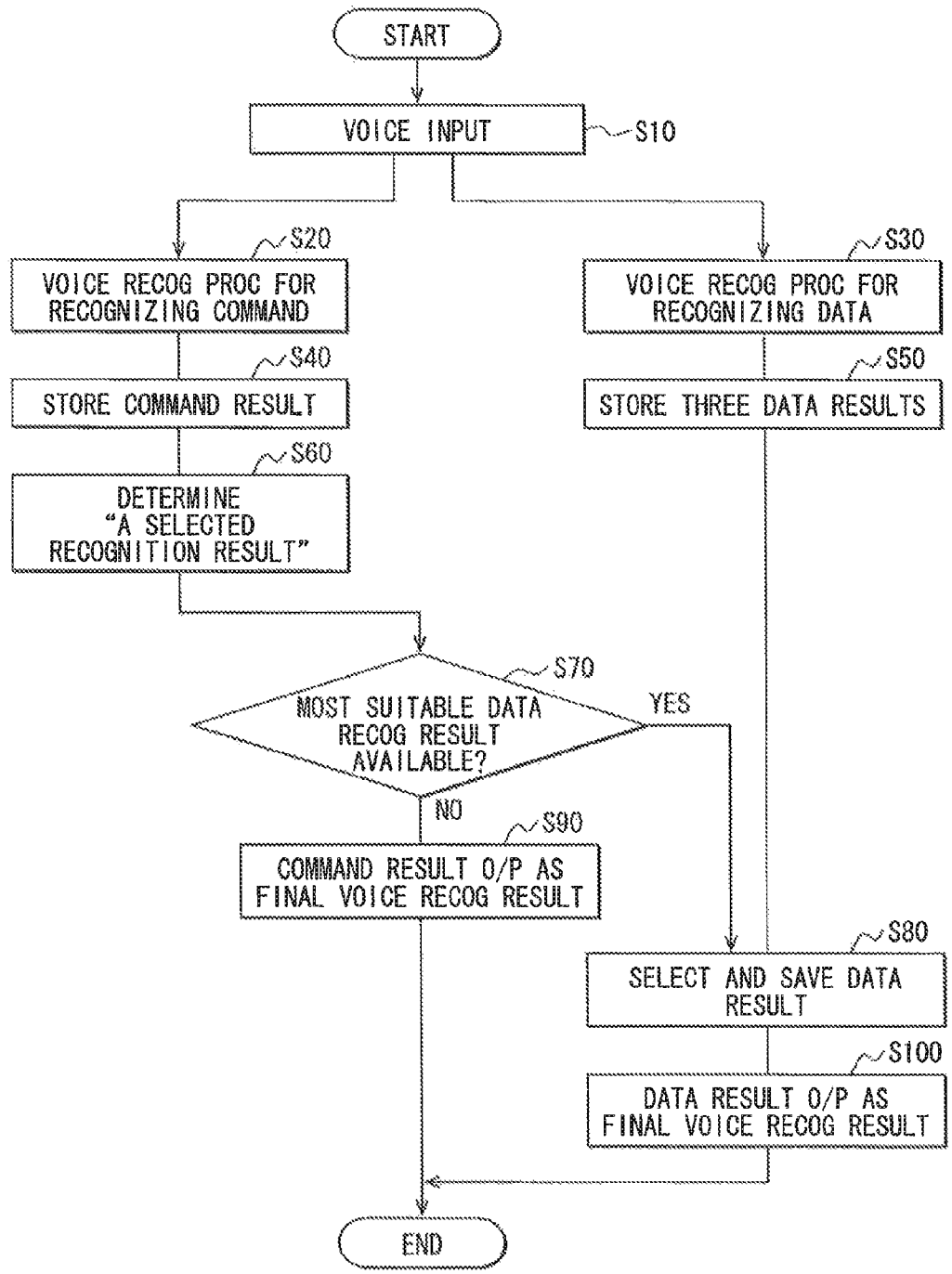
FIG. 3 is a flowchart of a voice recognition process.

With reference to a flowchart in FIG. 3, the operation of the voice recognition unit 18 and the control unit 19 in the above configuration is described.

In S10, when a voice input is received from the microphone 21, the process proceeds to both S20 and S30 at the same time. The voice recognition unit 18 performs the voice recognition process for recognizing a command in S20 and performs the voice recognition process for recognizing a data in S30 at the same time (i.e., two recognition processes are performed in parallel).

In S20, the voice recognition process for recognizing a command is performed by the command voice recognition unit 23A with reference to the command dictionary 25.

In S30, three voice recognition processes respectively for recognizing data in three data-categories (i.e., an address, a musical piece, a phone number) are performed at the same time (i.e., three recognition processes are performed in parallel) by the three recognition units 27, 28, 29 in the data voice recognition unit 24 with reference to three dictionaries 30, 31, 32. In such case, one voice recognition process of S20 and three voice recognition processes of S30 are performed at the same time (i.e., performed in parallel). Such parallel processing of four voice recognition processes may preferably be performed by multiple processors (e.g., by four processors).

When the voice recognition process in S20 is complete, the command recognized by voice recognition process S20 is transmitted by the command recognition result unit 26 to the command result storage unit 37 of the control unit 19 where it is stored in S40.

When the voice recognition process at S30 is complete, the data recognized by the voice recognition process performed by the recognition units 27, 28, 29 at S30 are transmitted to the recognition result units 33, 34, 35, respectively in S50.

Based on the command recognized in the voice recognition process, which is stored in the command result storage unit 37, the data result choice determination unit 39, at S60, determines a selected recognition result. The selected recognition result indicates either one of the three data results outputted by the recognition result units 33, 34, 35 or indicates no suitable voice recognition result from among the three data results.

Subsequently, based on result provided in S60, the data recognition result selection unit 36, at S70, determines whether the selected recognition result indicates one of three data recognition results from the three recognition result units 33, 34, 35.

When it is determined that one of the three data results is provided as the selected recognition result (S70: YES), the process proceeds to S80. In S80, the data result indicated by the selected recognition result is selected as the most suitable voice recognition result by the data recognition result selection unit 36, and is provided to the data result storage unit 38, where it is stored. The process proceeds to S100 to recognize the data stored in the data recognition result storage unit 38 as a final voice recognition result in order to output a voice recognition result. Such output is passed to the control circuit 11 and the voice synthesis unit 17.

On the other hand, based on the selected recognition result, when it is determined in S70 that none of three voice recognition results is the most suitable voice recognition result (S70: NO), the process proceeds to S90. In S90 the command stored in the command result storage unit 37 is provided as the final voice recognition result to the control circuit 11 and the voice synthesis unit 17. In such manner, a series of voice recognition processes is finished.

In the following, four examples of voice recognition processes performed by the voice recognition unit 18 and the control unit 19 are described with reference to FIGS. 4 to 7.

Figure 4:
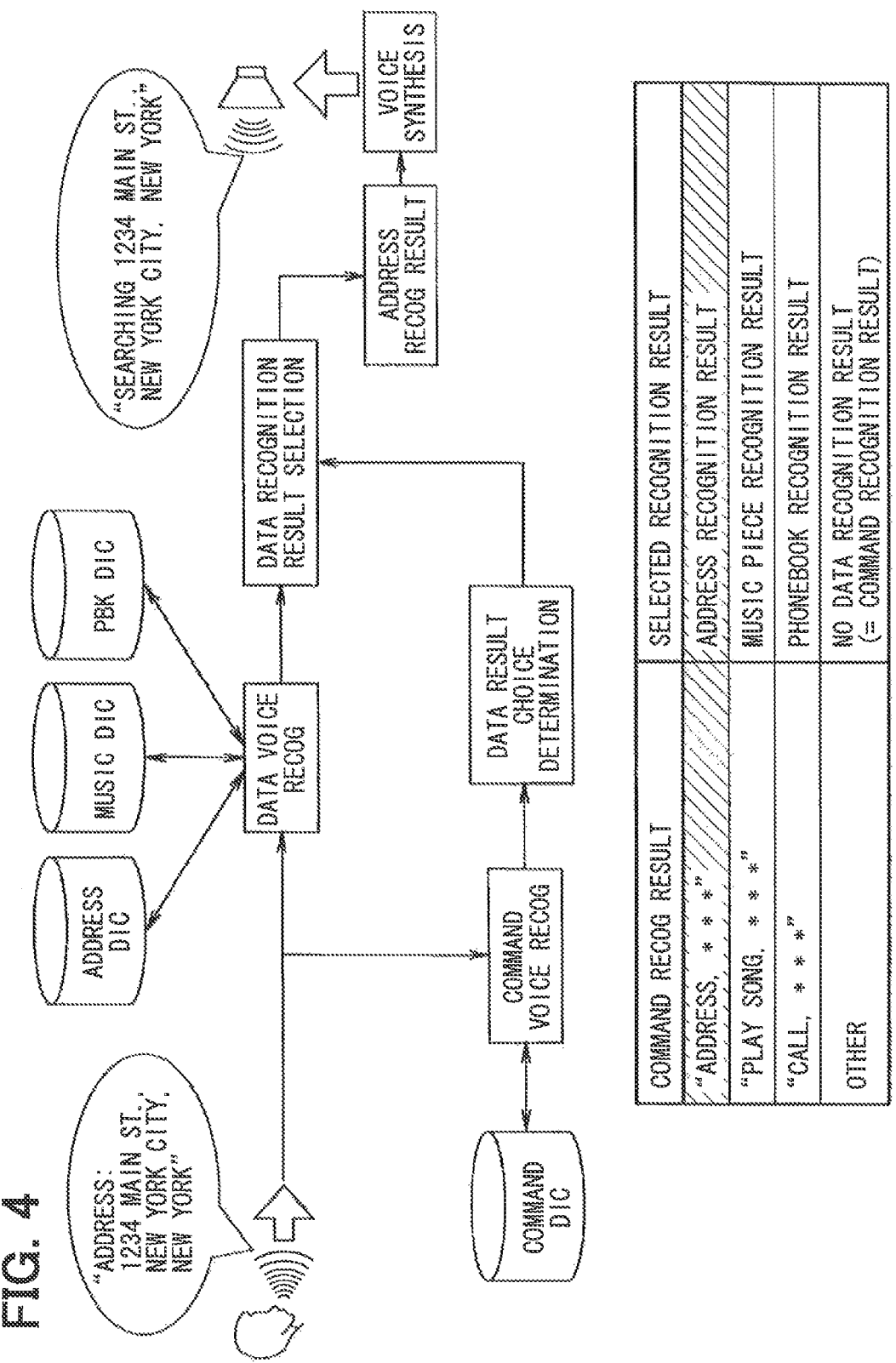
FIG. 4 is a first example of the voice recognition process of FIG. 3.

In the first example, as shown in FIG. 4, with the voice recognition process is performed when a user utters "Address: 1234 Main St., New York City, N.Y." The user may utter the sentence as a continuous input or it may input it with pauses.

In this case, the voice recognition result for a command by the command voice recognition unit 23 is determined as "Address, * * *," indicating that the command recognized is address-related. Therefore, the selected recognition result by the data result choice determination unit 39 is provided as recognized voice corresponding to a data-category of address data (i.e., the selected recognition result indicates the data result from "the address recognition result").

From among the outputs of the three recognition result units 33, 34, 35 of the data voice recognition unit 24, the voice recognition result of the address recognition result unit 33 (i.e., "* * *, 1234 Main St., New York City, N.Y.") is selected and outputted. As a result, the voice synthesis unit synthesizes a voice "Searching 1234 Main St., New York City, N.Y.", which is outputted from the speaker 20 (FIG. 4).

Figure 5:
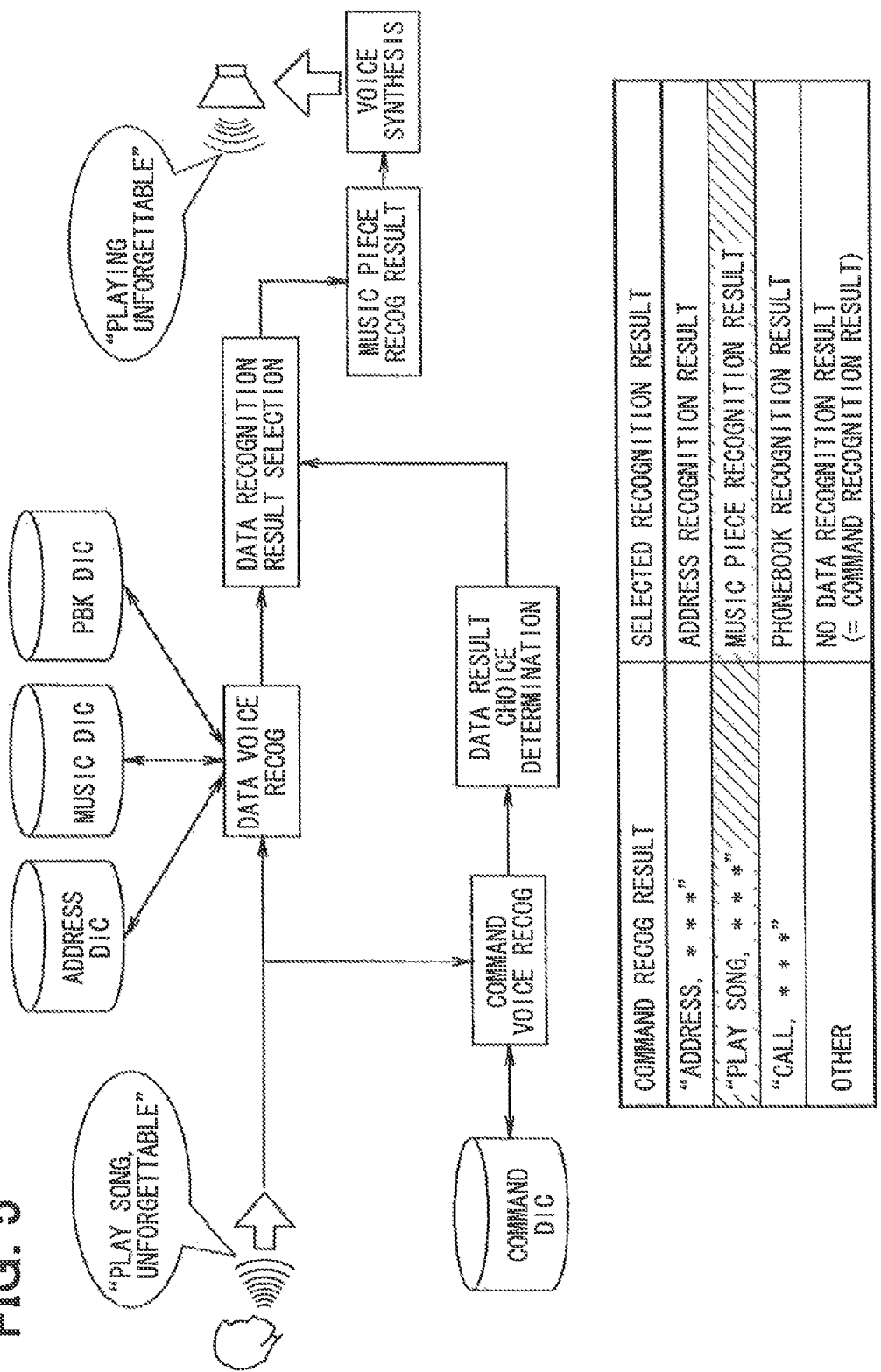
FIG. 5 is a second example of the voice recognition process of FIG. 3.

In the second example, shown in FIG. 5, a voice recognition process recognizes a user's voice when the user utters "Play song: Unforgettable."

In this case, the voice recognition result for a command by the command voice recognition unit 23 is determined as "Play song, * * *," indicating that the recognized command is music-related. Therefore, the selected recognition result by the data result choice determination unit 39 is provided as recognized voice corresponding to a data-category of music piece data (i.e., selected recognition result indicates the data result from "the music piece recognition result").

From among the outputs of the three recognition result units 33, 34, 35 of the data voice recognition unit 24, a voice recognition result of a music piece by the music piece recognition result unit 34 ("* * *, Unforgettable") is chosen and outputted. Accordingly, the voice synthesis unit synthesizes a voice "Playing Unforgettable", which is outputted from the speaker 20 (FIG. 5).

Figure 6:
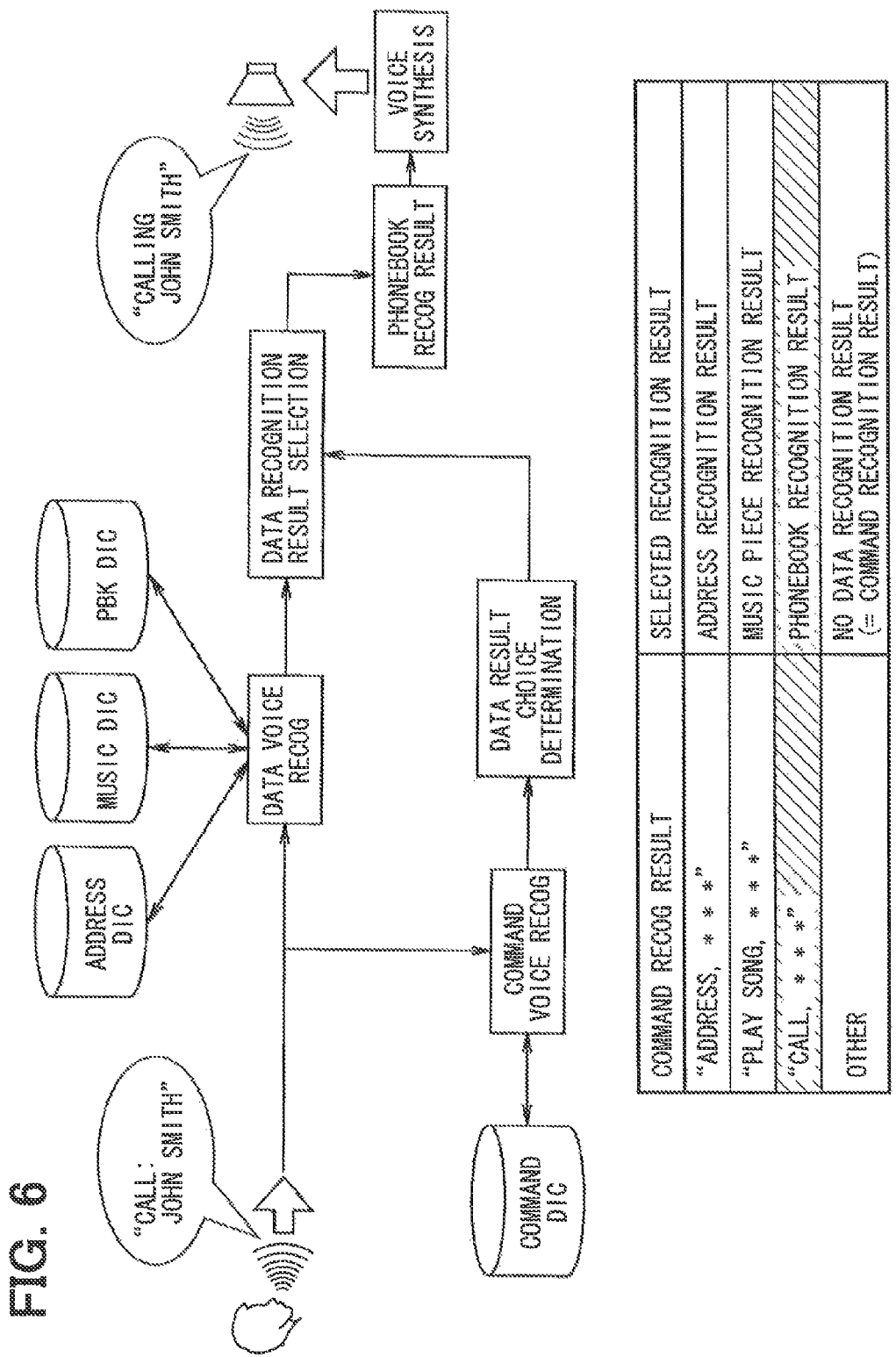
FIG. 6 is a third example of the voice recognition process of FIG. 3.

In the third example, shown in FIG. 6, a voice recognition process recognizes a user's voice when the user utters "Call: John Smith."

In this case, the voice recognition result for a command by the command voice recognition unit 23 is determined as "Call, * * *," indicating that the recognized command is telephone number related. Therefore, the selected recognition result by the data result choice determination unit 39 is outputted as recognized voice corresponding to a data-category of phonebook data (i.e., the selected recognition result is "phonebook recognition result").

From among the outputs of the three recognition result units 33, 34, 35 of the data voice recognition unit 24, a voice recognition result of a phonebook by the phonebook recognition result unit 35 ("* * *, John Smith") is chosen and outputted. As a result, the voice synthesis unit synthesizes a voice "Calling John Smith", which is outputted from the speaker 20 (FIG. 6).

In the fourth example, as shown in FIG. 7, a voice recognition process recognizes a user's voice when the user utters "Go home."

In this case, the voice recognition result for a command by the command voice recognition unit 23 is output as "Go home," indicating that the recognized command is categorized as "Other category." Therefore, the selected recognition result by the data result choice determination unit 39 is outputted as recognized voice corresponding to no preset data-category (Le., the selected recognition result is "no data recognition result"). Therefore, the voice recognition result for recognizing data will not be used, and the voice recognition result for recognizing a command will be used.

In other words, none of three outputs from the three recognition result units 33, 34, 35 of the data voice recognition unit 24 is used, and the voice recognition result for recognizing a command "Go home" by the command voice recognition unit 23 is outputted. As a result, the voice synthesis unit synthesizes a voice "Calculating route to home", which is outputted from the speaker 20 (FIG. 7).

In summary, when the voice recognition apparatus of the present disclosure recognizes a voice of the user, which is voiced/spoken in an un-interrupted manner or in a continuous input manner, the command voice recognition unit 23 recognizes a command portion of such input, and the data voice recognition unit 24 recognizes a data portion of such input. Therefore, even when the continuous input of the user's voice is long, such input is divided into a command portion and a data portion, and sifting of the recognition vocabulary is enabled. As a result, the voice recognition rate of both of the command portion and the data portion is improved.

Further, in the present embodiment, the data voice recognition unit 24 has three recognition units, that is, the address recognition unit 27, the music piece recognition unit 28 and the phonebook recognition unit 29, for recognizing the data portion of the voice. Based on the command recognized by the command voice recognition unit 23, the data result choice determination 39 chooses one voice (i.e., data) recognition result from among the three recognition results of the recognition result units 33, 34, 35.

According to the above configuration, by using three recognition units based on the data-category (i.e., data type), drastic sifting/narrowing of the recognition vocabulary is enabled, and one most suitable recognition result is chosen from among three data recognition results. Therefore, the voice recognition rate is further improved and the number of command input operations is reduced. In other words, the cumbersomeness of separate inputs of command and data is prevented.

However, when none of the data results from the recognition units 33, 34, 35 are suitable based on the command recognized, the data recognition result selection unit 36 selects and provides the command recognized by the command voice recognition unit 23 as the voice recognition result. Such voice recognition scheme improves the voice recognition rate.

Further, in the present embodiment, the voice recognition process by the command voice recognition unit 23 and the voice recognition processes by the three recognition units 27, 28, 29 of the data voice recognition unit 24 are performed at the same time, that is, in parallel with each other, thereby drastically reducing the time of voice recognition process and achieving very high responsiveness of the voice recognition process.

Although the present disclosure has been fully described in connection with the preferred embodiment thereof with reference to the accompanying drawings, it is to be noted that various changes and modifications will become apparent to those skilled in the art.

For instance, though the data voice recognition unit 24 has, in the above embodiment, three voice recognition units, the number of voice recognition units and/or the number of dictionaries in the data voice recognition unit 24 may be more than three or less than three.

Further, though the voice recognition process by the command voice recognition unit 23 and the voice recognition processes by the address voice recognition unit 27, the music piece voice recognition unit 28, and the phonebook voice recognition unit 29 of the data voice recognition unit 24 are performed at the same time in parallel with each other in the above embodiment, those voice recognition processes may be performed in series, or only two or three among four processes may be performed in parallel.

Such changes and modifications are to be understood as being within the scope of the present disclosure as defined by the appended claims.

What is claimed is:

1. A voice recognition apparatus comprising:
   a voice input unit inputting a voice in a continuous manner as a voice input, the voice input including a command portion and a data portion;
   a command recognizer recognizing the command portion of the voice input and outputting a command based on a voice recognition result of the voice input with reference to a command dictionary;
   a data recognizer recognizing the data portion of the voice input and outputting a data recognition result based on a voice recognition result of the voice input with reference to a data dictionary, the data dictionary including a plurality of data-category dictionaries corresponding to a plurality of data categories, and the data recognizer including a plurality of data-category recognizers respectively using one of the plurality of data-category dictionaries for recognizing the data portion of the voice input and outputting the data recognition result; and
   a voice recognition result selection unit selecting one of a plurality of data recognition results provided by the plurality of data-category recognizers, as a most suitable voice recognition result, based on the command provided by the command recognizer.

2. The voice recognition apparatus of claim 1, wherein the voice recognition result selection unit selects the command from the command recognizer as the most suitable voice recognition result when none of the data recognition results from the plurality of data-category recognizers is suitable.

3. The voice recognition apparatus of claim 1, wherein the command recognizer and the plurality of data-category recognizers of the data recognizer simultaneously perform respective voice recognition processes.

4. The voice recognition apparatus of claim 1, wherein the plurality of data-category dictionaries are an address dictionary, a music piece dictionary, and a phonebook dictionary, and
   the plurality of data-category recognizers are an address recognizer, a music piece recognizer, and a phonebook recognizer.

5. The voice recognition apparatus of claim 4, wherein the voice recognition result selection unit selects the data recognition result of an address by the address recognizer when the command recognized by the command recognizer is an address related command,
   the voice recognition result selection unit selects the data recognition result of a music piece by the music piece recognizer when the command recognized by the command recognizer is a music piece related command, and
   the voice recognition result selection unit selects the data recognition result of a phonebook by the phonebook recognizer when the command recognized by the command recognizer is a telephone related command.

6. The voice recognition apparatus of claim 1, wherein the data dictionary and the command dictionary are separately disposed.

7. The voice recognition apparatus of claim 1, wherein the plurality of data categories correspond to types of commands outputted by the command recognizer.

* * * * *